May 26, 1931.  O. F. WARHUS  1,806,771
ROAD VEHICLE
Filed Nov. 17, 1927
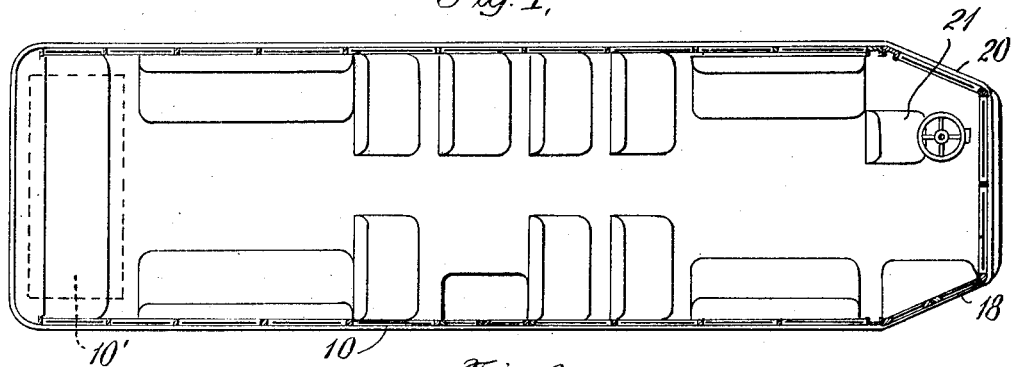
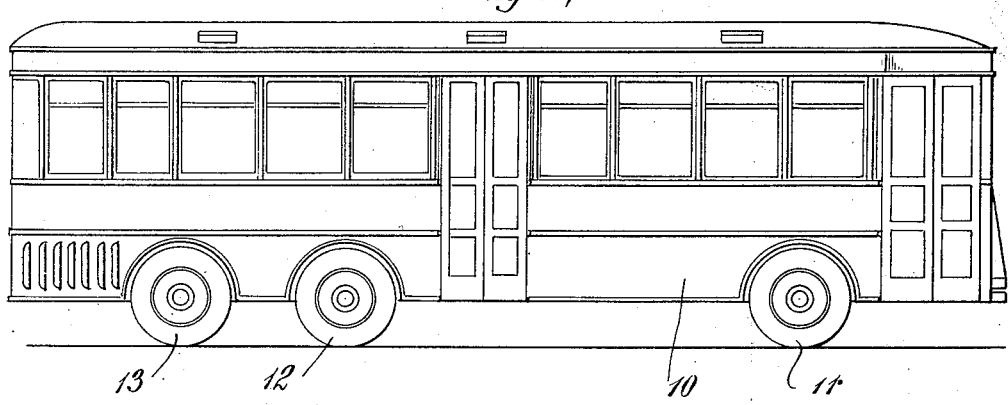
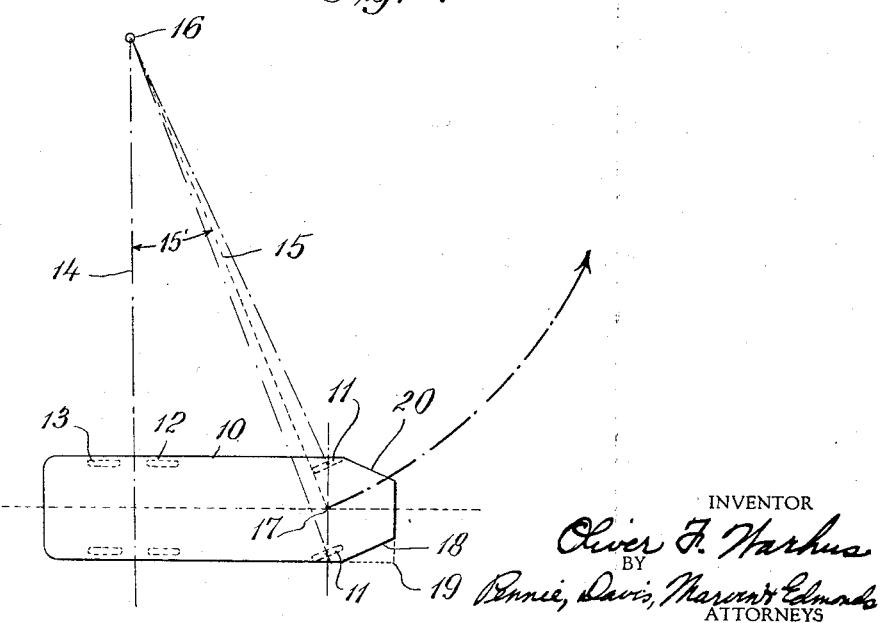
INVENTOR
Oliver F. Warhus
BY
Bennie, Davis, Marvin & Edmonds
ATTORNEYS Patented May 26, 1931

1,806,771

UNITED STATES PATENT OFFICE

OLIVER F. WARHUS, OF ALBANY, NEW YORK, ASSIGNOR TO VERSARE CORPORATION, A CORPORATION OF NEW YORK

ROAD VEHICLE

Application filed November 17, 1927. Serial No. 233,792.

This invention relates to road vehicles and has particular reference to electric or internal combustion motor-driven road vehicles of the so-called "trackless" or bus type, the travel of which is not restricted to narrow limits on the roadway by rails or the like. The vehicle of this invention is particularly adapted to the transportation of large numbers of passengers, and the consequent large dimensions and great weight of such a vehicle introduce and greatly complicate the problems of sufficient mobility and ready handling by the driver. Because of the nature of the work required of such a vehicle in that it must traverse the dense traffic of highways and city streets with frequent stops along the roadside or curb for receiving and discharging passengers, it is especially desirable that the driver may handle and guide the vehicle with the ease and facility experienced in the handing and guiding of a vehicle of much smaller dimensions and less weight, such as the ordinary passenger automobile. The labor of driving large vehicles has been considerably lessened by providing mechanical improvements in the operating mechanism of the vehicle, among which are power brakes, clutches, and the like, but these improvements in no way facilitate the guiding of the vehicle which involves continually weaving in and out between other vehicles to approach and leave the road-side or curb for receiving or discharging passengers.

It is the principal object of this invention to provide a vehicle which remedies the difficulties experienced in handling and guiding of large and cumbersome road vehicles. The vehicle of the present invention may be handled and guided in heavy traffic with the ease and facility of a vehicle having much smaller dimensions and much less weight. Another object of the invention is to provide a road vehicle, which, because of this ease in handling and guiding, may be made in very large sizes, thus procuring greatly increased carrying capacity. A further object of the invention is to provide a road vehicle which is so constructed as to eliminate the majority of the projections and waste spaces occurring inside and outside of vehicles employed heretofore, thus making available as carrying space practically all of the area included within the confines of the exterior dimensions of the vehicle. Additional objects and advantages will become apparent from the further description of the invention.

The invention involves the type of road vehicle in which a portion of the box-like vehicle body extends forward of the front wheels and the construction thereof is governed by the circle described by the steering wheels when they are turned to the greatest steering angle allowable within the limits of stability of the vehicle. The steering wheels and trailing wheels are preferably disposed within the confines of the exterior dimensions of the vehicle, so that there are neither fender, bumper, chassis, nor body projections extending outside a prescribed limit which is governed by the minimum turning circle of the vehicle, and accordingly, such portions of the body and the like which would normally extend outside of this circle, are beveled or otherwise shaped to be always included within this limit. Inasmuch as the front of the vehicle leads in guiding the vehicle while turning, it is preferred that the front be bevelled or otherwise shaped so as to be included within or defined by a plane perpendicular to the minimum turning radius of the circle describable by the steering wheels when turned to their greatest steering angle, and this requirement obviously includes the other turning circles between the minimum turning circle and straight line travel of the vehicle. Inasmuch as the bevelling of the front of the vehicle at an angle which is perpendicular to the shortest turning radius of the steering wheels results in a front which is considerably narrower than the maximum width of the vehicle, the driver need only be concerned about guiding this relatively narrow front portion since the rear wheels and all other parts of the vehicle will then follow within the arc described by this bevel and clearance between the nearest other vehicle or road obstruction is assured in spite of the fact that the remainder of the vehicle extends a considerable distance to the right and left of this front portion.

This arrangement also enables the driver's position to be placed on the extreme forward end of the vehicle body, well within the bevelled front portion so that guiding of the vehicle is facilitated and considerable space saved. By virtue of this invention, therefore, large and cumbersome road vehicles may be guided and handled as readily as a vehicle of much smaller dimensions, and such vehicles may be made much larger than heretofore without sacrificing mobility and easy handling.

For a better understanding of the invention, reference is made to the accompanying drawings, in which Figure 1 is an interior plan view of a road vehicle constructed according to this invention;

Fig. 2 is a side elevation of the same; and

Fig. 3 is a diagrammatic representation of the manner of constructing a road vehicle according to this invention.

In these drawings numeral 10 designates the vehicle which may be arranged for seating passengers in any desirable manner. The box-like body of the vehicle is mounted upon a plurality of wheels, three pairs being illustrated in the drawings as representing one form of road vehicle to which the invention is applicable. Of these wheels, the front pair 11 are the steering wheels whereas the rear pairs 12 and 13 may be non-steerable and driven. The body 10 of the vehicle is substantially rectangular-shaped in horizontal cross-section and the blunt front end thereof extends a considerable distance forward of the center line of the steering wheels 11, whereas the power-plant 10' may be mounted at the rear of the body leaving the front portion clear of the usual engine hood and other projections. The center of the steering radius is on a line perpendicular to the longitudinal axis of the vehicle from a point approximately midway between wheels 12 and 13 as shown in Fig. 3, this line being designated 14. The average angle of the front steering wheels is equivalent to an angle formed between line 14 and a line 15 which bisects the angle formed between normals to both front steering wheels 11 when they are turned to their greatest allowable steering angle. This average angle is designated by numeral 15' in Fig. 3 and the locus of the intersection of lines 14 and 15 is accordingly the turning center of the vehicle as a whole, this center being marked 16. The point 17 on the horizontal axis of the vehicle marked by the intersection of this axis and line 15 accordingly describes the average turning arc of the vehicle which is shown in the drawings by means of the arrow. Obviously the arc described by the rear wheels 12 and 13 is of lesser radius than that described by the front wheels 11. It is well known that the projections extending beyond the turning circle of a vehicle extend to the greatest distance when the vehicle is being turned upon its shortest turning radius and, therefore, in order to facilitate the turning of the vehicle and shorten these objectionable projections, those portions of the vehicle which project are bevelled at an angle which is perpendicular to the shortest turning radius of the vehicle. As shown in Fig. 3, the distance of line 15 between points 17 and center 16 is the average shortest turning radius of the vehicle and therefore the front of the vehicle is bevelled at point 18 at an angle which is perpendicular to radius 15. This bevelling accordingly removes the projection 19 which normally extends outside of the turning circles in vehicles of the ordinary construction. The opposite side of the front of the vehicle 10 may be also bevelled as shown at 20 and at the same angle at which 18 is bevelled. While it is preferred that the bevelling of the front portion of the vehicle be coincident with the front wheels 11 when turned to their greatest angle, nevertheless this is not always possible but it is attempted to approach this angle as closely as permissible according to other problems involved in the construction of the vehicle.

By bevelling the front of vehicles according to the shortest turning radius thereof and maintaining as much of the vehicle as is possible within the minimum turning circle of the vehicle, it is therefore possible to lend to the vehicle the mobility of a much smaller car and thus by virtue of this invention the guiding and handling of large vehicles is greatly facilitated and the limits of size are considerably extended. By placing the driver's seat 21 within the bevelled portion of the front of the vehicle and as close to the front of the vehicle as is possible, the driver by guiding the relatively narrow front of the body need not be concerned with the remainder of the vehicle since by guiding this relatively narrow front portion the remainder of the vehicle follows well within the arc described by the bevel and clearance between all parts of the vehicle and the nearest road obstruction is assured in spite of the fact that the remaining portions of the vehicle extend a considerable distance to the right and left of this narrow front portion. The rear end of the vehicle body may be shaped in a similar way, depending upon the location of the steerable wheels, whether the rear wheels are steerable, where all sets of wheels are steerable or depending upon the length of the body, and the like. Normally, however, the rear wheels are not steerable and describe an arc of lesser radius than the arc described by the front or steerable wheels. It is therefore to be understood that the invention is not limited to the exact disclosures of the drawings and specification, but may be altered as desired within the scope of the appended claim.

I claim:—

In a road vehicle, a plurality of pairs of wheels the front pair of which are steerable, a body supported by said wheels and having a projecting front portion, said front portion comprising a front wall and beveled rearwardly extending vertical walls which connect said front wall with the main side walls of the body, the angle of bevel of said beveled walls being such that the bevel portion is substantially parallel to the front wheels when they are turned to their maximum steering angle so that when making a turn substantially the entire area of the vehicle is confined within the arc described by the juncture of the front wall with the outside beveled wall, and a driver's seat in the front part of the body within the beveled portion thereof.

In testimony whereof I affix my signature.

OLIVER F. WARHUS.